(12) United States Patent
Stevens

(10) Patent No.: US 8,228,561 B2
(45) Date of Patent: Jul. 24, 2012

(54) METHOD AND SYSTEM FOR SELECTIVE BITMAP EDGE SMOOTHING

(75) Inventor: Michael Dale Stevens, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 1455 days.

(21) Appl. No.: 11/694,378

(22) Filed: Mar. 30, 2007

(65) Prior Publication Data
US 2008/0239401 A1 Oct. 2, 2008

(51) Int. Cl.
*G06T 11/60* (2006.01)

(52) U.S. Cl. ........ 358/3.27; 358/1.9; 358/2.1; 358/3.06; 358/538; 358/539; 382/176; 382/173; 382/260; 382/266; 382/269

(58) Field of Classification Search ............... 358/1.1, 358/1.9, 2.1, 3.06, 3.27, 538, 539; 382/176, 382/173, 260, 266, 269
See application file for complete search history.

(56) References Cited

U.S. PATENT DOCUMENTS

| | | | |
|---|---|---|---|
| 4,194,221 A | 3/1980 | Stoffel | |
| 4,811,115 A | 3/1989 | Lin et al. | |
| 4,941,190 A | 7/1990 | Joyce | |
| 5,131,049 A | 7/1992 | Bloomberg et al. | |
| 5,216,753 A | 6/1993 | Ng | |
| 5,303,334 A | 4/1994 | Snyder et al. | |
| 5,307,180 A | 4/1994 | Williams et al. | |
| 5,327,262 A | 7/1994 | Williams | |
| 5,404,411 A * | 4/1995 | Banton et al. | 382/254 |
| 5,434,953 A | 7/1995 | Bloomberg | |
| 5,526,438 A | 6/1996 | Barton | |
| 5,604,605 A | 2/1997 | Moolenaar | |
| 5,701,364 A | 12/1997 | Kanno | |
| 5,765,029 A | 6/1998 | Schweid et al. | |
| 5,778,156 A | 7/1998 | Schweid et al. | |
| 5,784,049 A | 7/1998 | Hall | |
| 5,850,474 A | 12/1998 | Fan et al. | |
| 5,852,678 A | 12/1998 | Shiau et al. | |
| 5,930,396 A | 7/1999 | Fiala et al. | |
| 5,949,964 A * | 9/1999 | Clouthier et al. | 358/3.06 |
| 5,960,106 A | 9/1999 | Tsuchiya et al. | |
| 6,020,978 A | 2/2000 | Cooper et al. | |

(Continued)

FOREIGN PATENT DOCUMENTS

EP 0683599 11/1995

(Continued)

OTHER PUBLICATIONS

Clive "Max" Maxfield, Hug an XOR gate today: An introduction to Reed-Muller logic, Mar. 1, 1996, EDN Access, pp. 1-3.*

(Continued)

*Primary Examiner* — King Poon
*Assistant Examiner* — Jamares Q Washington
(74) *Attorney, Agent, or Firm* — Michael J. Nickerson LLP

(57) ABSTRACT

An image processing system utilizes an image type classification circuit to identify inputted image data as picture image data or text/graphics image data. A halftone circuit, operatively connected to the image type classification circuit, converts the inputted image data, identified as picture image data, to halftone image data. Moreover, a tile pattern circuit, operatively connected to the image type classification circuit, to replace the inputted image data, identified as text/graphics image data, with tile patterns. The tile patterns are encoded with a predetermined pattern. A bitmap rendering circuit combines the halftone image data with the encoded tile patterns to render a bitmap, wherein the bitmap can be used by a print engine to reproduce the image.

3 Claims, 21 Drawing Sheets

U.S. PATENT DOCUMENTS

| | | | |
|---|---|---|---|
| 6,144,489 A * | 11/2000 | Wilson et al. | 359/385 |
| 6,157,736 A * | 12/2000 | Jodoin et al. | 382/173 |
| 6,181,829 B1 | 1/2001 | Clark et al. | |
| 6,185,328 B1 | 2/2001 | Shiau | |
| 6,229,923 B1 | 5/2001 | Williams et al. | |
| 6,240,205 B1 | 5/2001 | Fan et al. | |
| 6,347,153 B1 | 2/2002 | Triplett et al. | |
| 6,382,757 B1 | 5/2002 | Kakutani | |
| 6,549,658 B1 | 4/2003 | Schweid et al. | |
| 6,760,126 B1 | 7/2004 | Kritayakirana et al. | |
| 6,983,076 B2 | 1/2006 | Curry et al. | |
| 7,079,281 B1 | 7/2006 | Ng et al. | |
| 7,079,287 B1 | 7/2006 | Ng et al. | |
| 7,609,411 B2 * | 10/2009 | Silverbrook et al. | 358/1.6 |
| 7,706,021 B2 * | 4/2010 | Kaburagi | 358/1.9 |
| 2001/0045957 A1 | 11/2001 | Ulichney | |
| 2003/0058250 A1 | 3/2003 | Adams et al. | |
| 2004/0114185 A1 * | 6/2004 | Shiau et al. | 358/2.1 |
| 2005/0052468 A1 | 3/2005 | Kroon | |
| 2010/0290089 A1 | 11/2010 | Stevens et al. | |

FOREIGN PATENT DOCUMENTS

| | | | |
|---|---|---|---|
| EP | 1107577 A2 * | 6/2001 | |
| WO | WO9933257 | 7/1999 | |

OTHER PUBLICATIONS

File history of U.S. Appl. No. 12/467,441, filed May 18, 2009 (published Nov. 18, 2010 as US-2010-0290089-A1); Inventor: Michael Dale Stevens.

Prosecution history of US patent 7,239,430 issued Jul. 3, 2007 (U.S. Appl. No. 10/318,614, filed Dec. 12, 2002, published Jun. 17, 2004 as US 2004-0114185 A1; Inventors Shiau et al.

Prosecution history as of Nov. 22, 2010 for U.S. Appl. No. 10/655,719; Inventor Stephen M. Kroon.

* cited by examiner

METHOD AND SYSTEM FOR SELECTIVE BITMAP EDGE SMOOTHING

BACKGROUND AND SUMMARY

Digital multifunction reprographic systems are well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit that may re-order or reorganize these pages and then, depending on the request of the user of the device, send the pages or images to a destination. Often this destination is an attached printing unit that makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (PDLs) to the native format of the printing device.

An important inner component of such a conventional multifunction digital device is the image path. This combination of software and hardware elements accepts the electronic images from a multiplicity of sources and performs any operations needed to convert the images to the format desired for the various output paths. The image path is usually one of the more complex and costly components of such digital multifunction devices.

In some conventional systems, the image path has two parallel paths or methods for rendering binary data into a frame buffer memory. In these conventional systems, image data, which has been identified or classified as picture image data, is rendered in raster sequence, while image data, which has been identified or classified as text image data and graphics image data, is rendered from pre-built tile patterns. The binary tile patterns are created using halftone threshold arrays and are copied into the frame buffer memory inside each object or text boundary to create the appropriate text or graphics image in the frame buffer memory.

The conventional systems, which implement the image path having two parallel paths or methods for rendering binary data into a frame buffer memory, create a bitmap in the frame buffer memory consisting of binary tile patterns combined with the halftoned raster data from picture image data and non-halftoned data. However, the conventional two-path implementation produces text and graphics objects with jagged and poorly formed edges due to the halftoning from clustered dot screens. Moreover, after rendering into a binary format, these conventional systems fail to bridge the gaps between the clusters, thereby failing to smooth the edges of text and graphics.

More specifically, jagged edges, and poorly formed shapes occur because the pixel clusters in the halftone screens only paint spots at a particular frequency and angle. Edges and areas in between the clusters are left blank.

Although higher halftone frequencies with a smaller distance in between the clusters make smoother edges, most conventional laser printers do not print well with the higher frequency screens. On the other hand, with respect to many conventional print engines, the shades are more stable, and appear smoother when the frequencies are between one hundred to one hundred fifty lines per inch.

Thus, a low frequency screen provides for smoother shades but jagged edges, while a higher frequency screen provides for smooth edges but less stable shades.

Therefore, it is desirable to implement an image path having two parallel paths or methods for rendering binary data into a frame buffer memory that produces text and graphics objects without jagged or poorly formed edges. Also, it is desirable to implement an image path having two parallel paths or methods for rendering binary data into a frame buffer memory that bridges the gaps between the clusters, thereby smoothing the edges of text and graphics. Furthermore, it is desirable to implement an image path having two parallel paths or methods for rendering binary data into a frame buffer memory that avoids damaging the more complex picture objects when the same halftone patterns are used for both image paths. Finally, it is desirable to implement an edge smoothing process during rendering that improves the shape and appearance of halftoned objects and halftoned text with the lower frequency screens.

BRIEF DESCRIPTION OF THE DRAWING

The drawings are only for purposes of illustrating various embodiments and are not to be construed as limiting, wherein.

DETAILED DESCRIPTION

Figure 1:
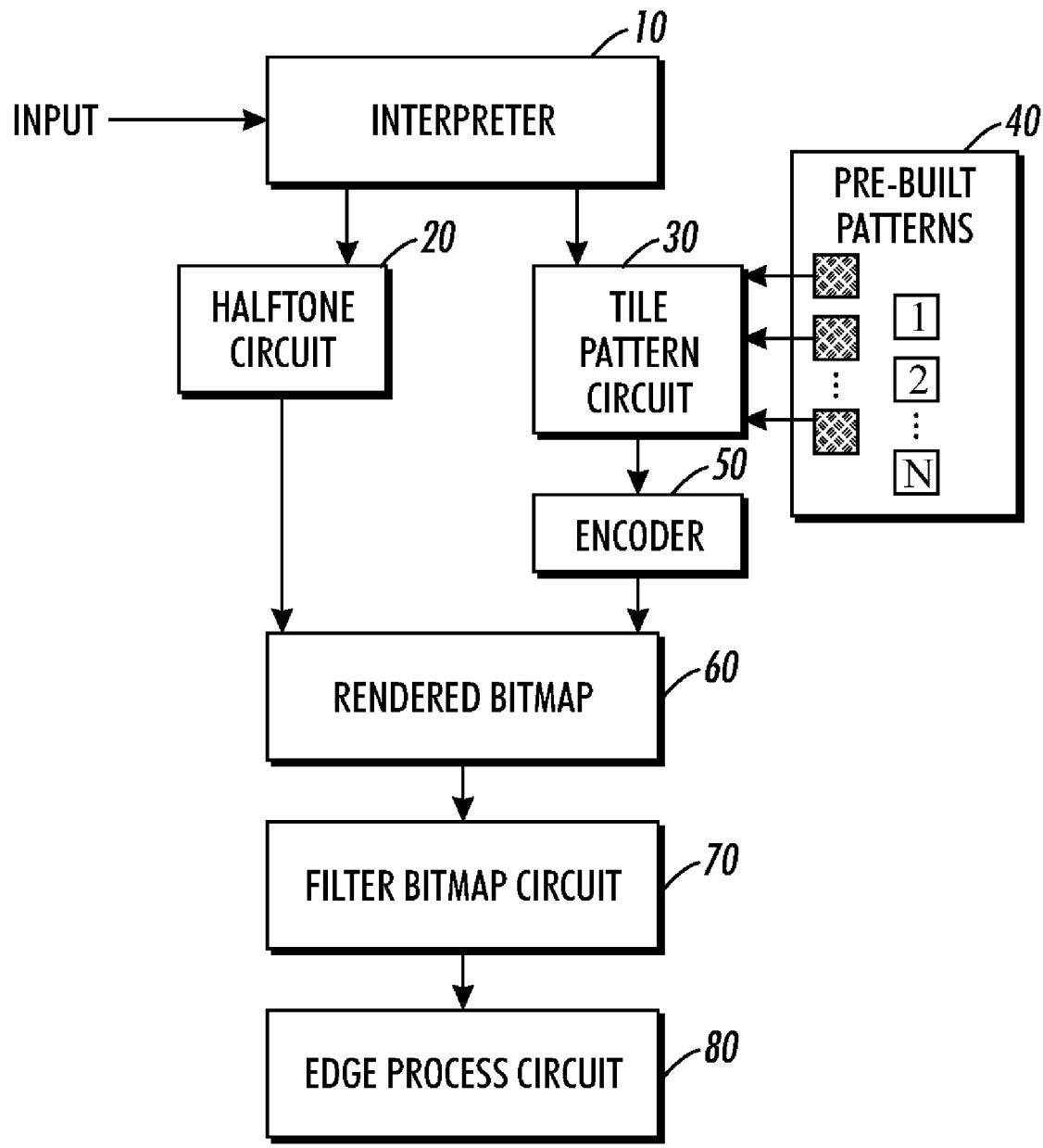
FIG. 1 shows an image path having two parallel paths for rendering binary data into a frame buffer memory wherein the binary tile patterns are encoded.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 shows, in schematic form, an image path of a reprographic system. The image path is a combination of hardware and software elements that generate and process the digital images.

As illustrated in FIG. 1, digital image data is input into an interpreter 10 that analyzes the image data to determine if the image data is picture image data or text/graphics image data. The interpreter 10 utilizes conventional image classification routines/circuitry or image segmentation routines/circuitry. An example of a conventional image classification routine/circuit is described in U.S. Pat. No. 5,765,029. The entire content of U.S. Pat. No. 5,765,029 is hereby incorporated by reference.

Based upon the classification determined by the interpreter 10, picture image data is sent to a halftone circuit 20 and text/graphics image data is sent to a tile pattern circuit 30. The halftone circuit 20 converts the picture image data into the appropriate halftone image data, while the tile pattern circuit 30 replaces the text/graphics image data with the appropriate binary halftone tile pattern. An example of binary halftone tile pattern circuit is described in Published US Patent Application, Publication Number 2005/00524468. The entire content of Published US Patent Application, Publication Number 2005/00524468, is hereby incorporated by reference.

After converting the text/graphics image data to a binary halftone tile pattern, the binary halftone tile pattern is encoded with a pattern by encoder 50. An example of a pattern for encoding is a high frequency checkerboard pattern as illustrated in FIGS. 3 and 13.

Figure 3:
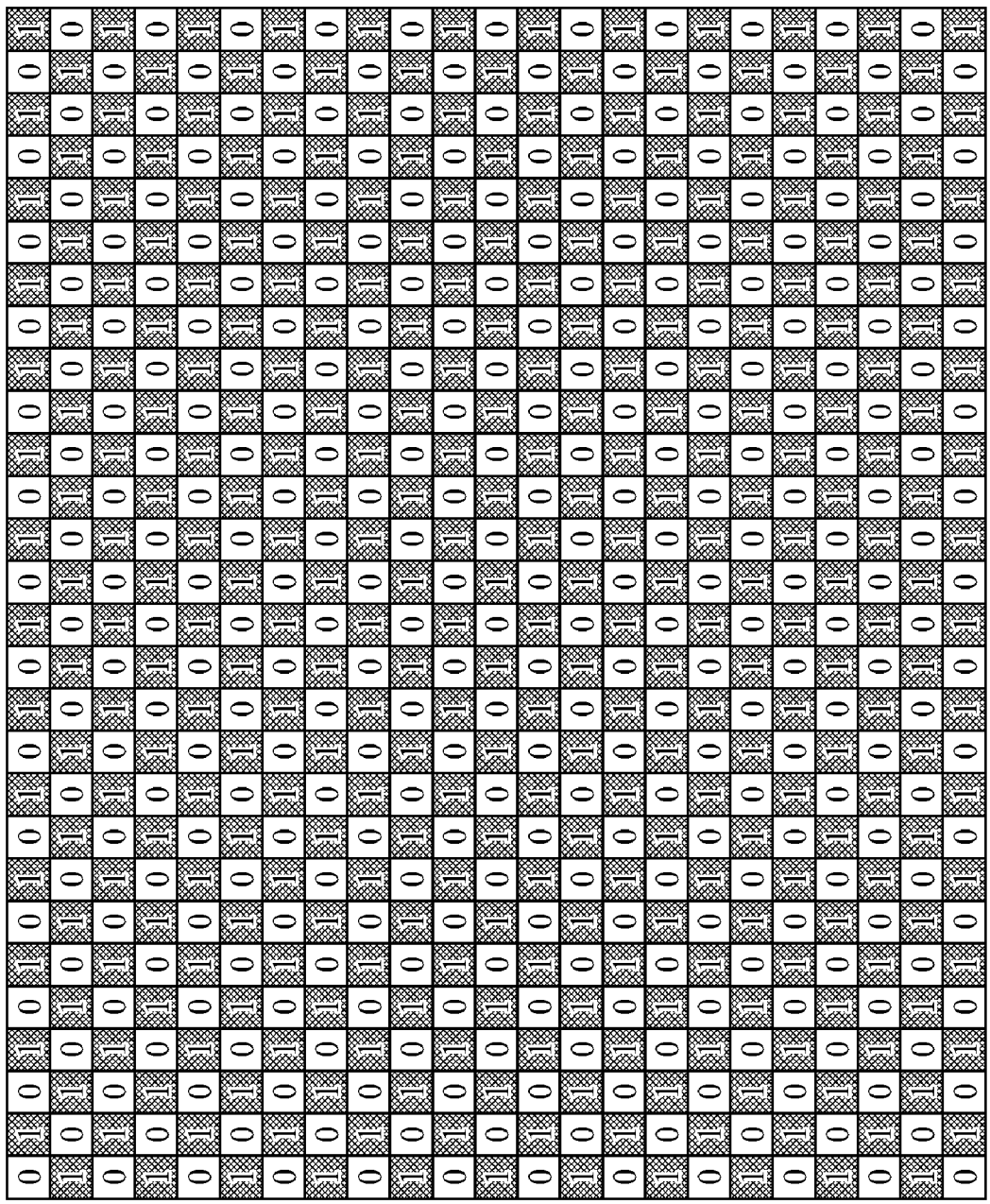
FIG. 3 shows an example of a high frequency checkerboard pattern used in encoding the binary tile patterns.
Figure 13:
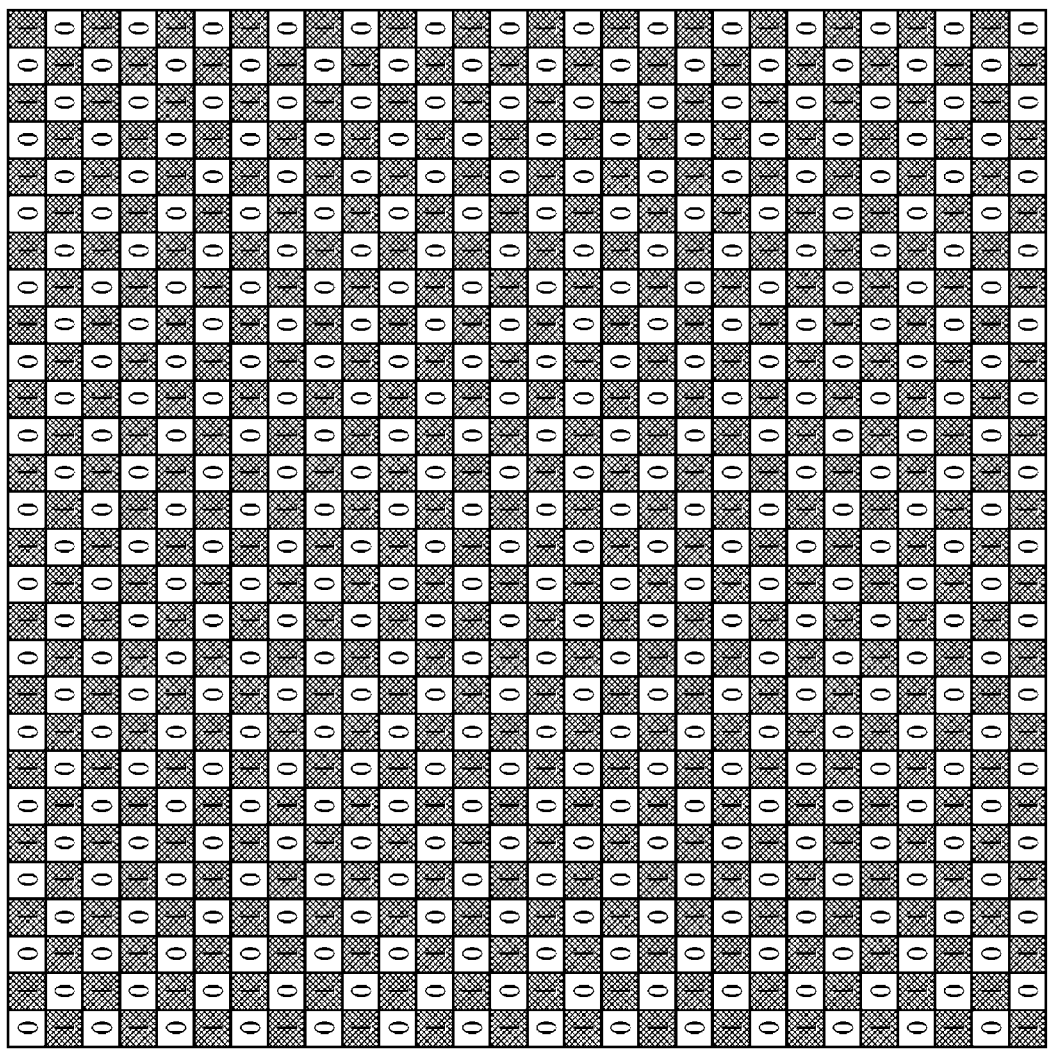
FIG. 13 shows another example of a high frequency checkerboard pattern used in encoding the binary tile patterns.

It is noted that the tile patterns can be pre-encoded with a high frequency checkerboard pattern as illustrated in FIGS. 3 and 13. In the situation where the tile patterns are pre-encoded with a high frequency checkerboard pattern, the encoder 50 would not be necessary.

It is further noted that encoder 50 could be an optional encoding. More specifically, the encoder 50 can be invoked in response to a user selected feature or image classification, or the encoder 50 can merely pass the tile pattern through without encoding in response to a user selected feature or image classification.

The halftone image data from the halftone circuit 20 is combined with encoded tile patterns from the encoder 50 to render a bitmap that is store in a frame buffer memory 60. The bitmap is subsequently filtered by the filter bitmap circuit 70. The filter bitmap circuit 70 creates mask identifying encoded areas, decodes the encoded areas, and passes through unencoded areas. These processes will be described in more detail below. The bitmap-filtered data is passed onto the edge process circuit 80.

The edge process circuit 80 finds edge pixel candidates from decode mask, filters out unwanted edge candidates, and adjusts edge darkness by adding pixels and regrouping. These processes will be described in more detail below. The edge-processed data is ready to be sent to the printer.

As noted above, the system has two methods for rendering binary data into frame buffer memory. Pictures are rendered in raster sequence, while text and graphics are rendered from pre-built tile patterns. The binary tile patterns are rendered using halftone threshold arrays and are normally copied into the frame buffer inside each object or text boundary. The pre-built binary halftone tiles are encoded with a high frequency checkerboard pattern, so the bitmap in the frame buffer memory will consist of these patterns combined with the halftoned raster data from pictures and non-halftoned data The high frequency checkerboard pattern of the encoded data reveals the true shape and edges of the halftoned objects. The encoded pattern is filtered and decoded in the frame memory to restore original halftone pattern before being sent to the print engine. Since the edges are identified while decoding, the edges are made smoother by adding pixels to bridge the gaps between the halftone clusters along the object and text borders. The pictures and other objects are not affected.

By utilizing the encoded tile patterns the jagged edges of halftoned objects are smoothed smooth and the intended shapes of fonts, objects, and fine lines are preserved.

Figure 2:
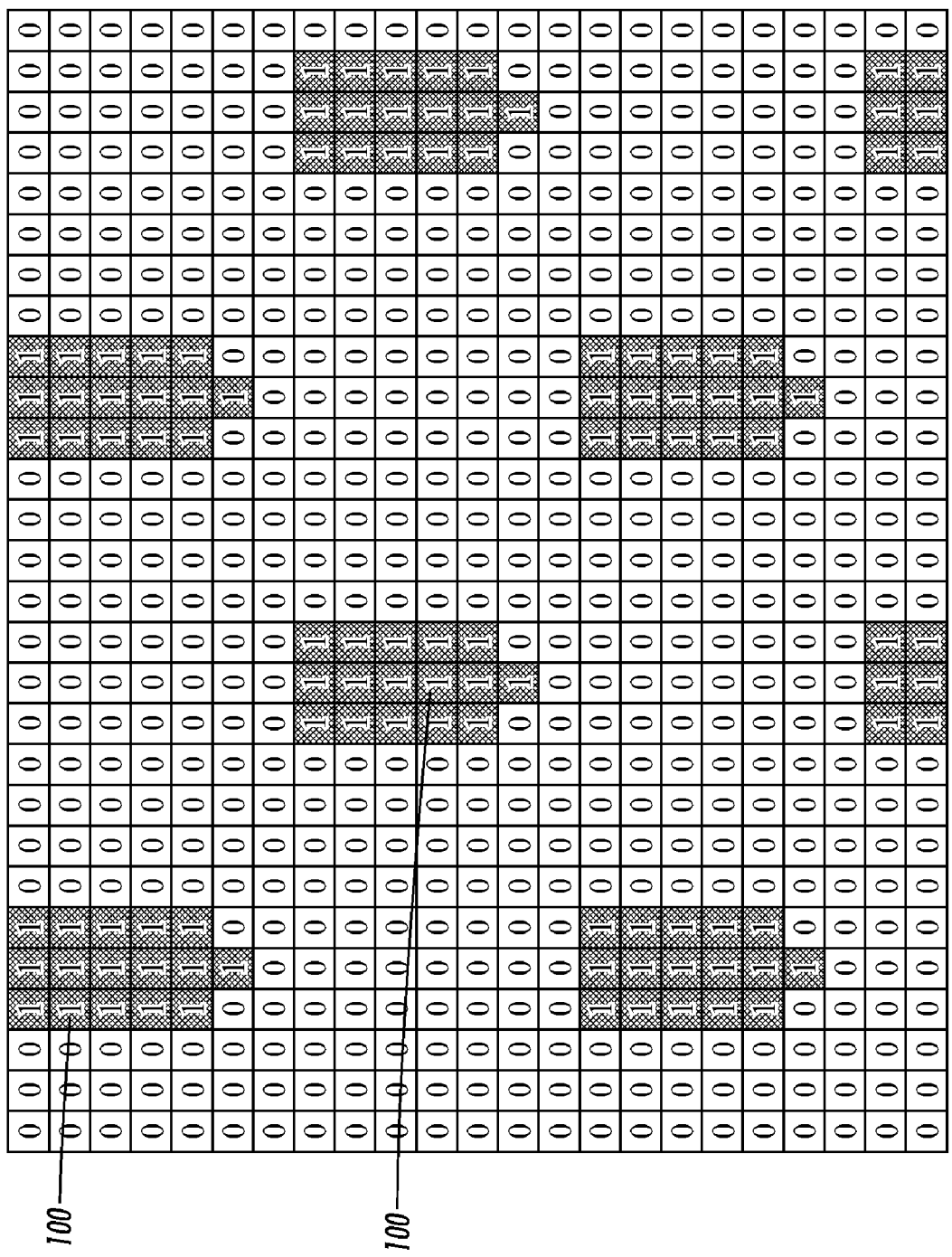
FIG. 2 shows an example of an original halftone.

FIGS. 2-21 will be used in describing examples of preserving the intended shape of each object along with the halftone patterns. FIG. 2 illustrates an example of a binary halftone tile pattern wherein the binary ON pixels are located in clusters 100. FIG. 3 illustrates a high frequency checkerboard pattern. The checkerboard pattern consists of alternating pixels, ON and OFF in both x and y directions.

Figure 4:
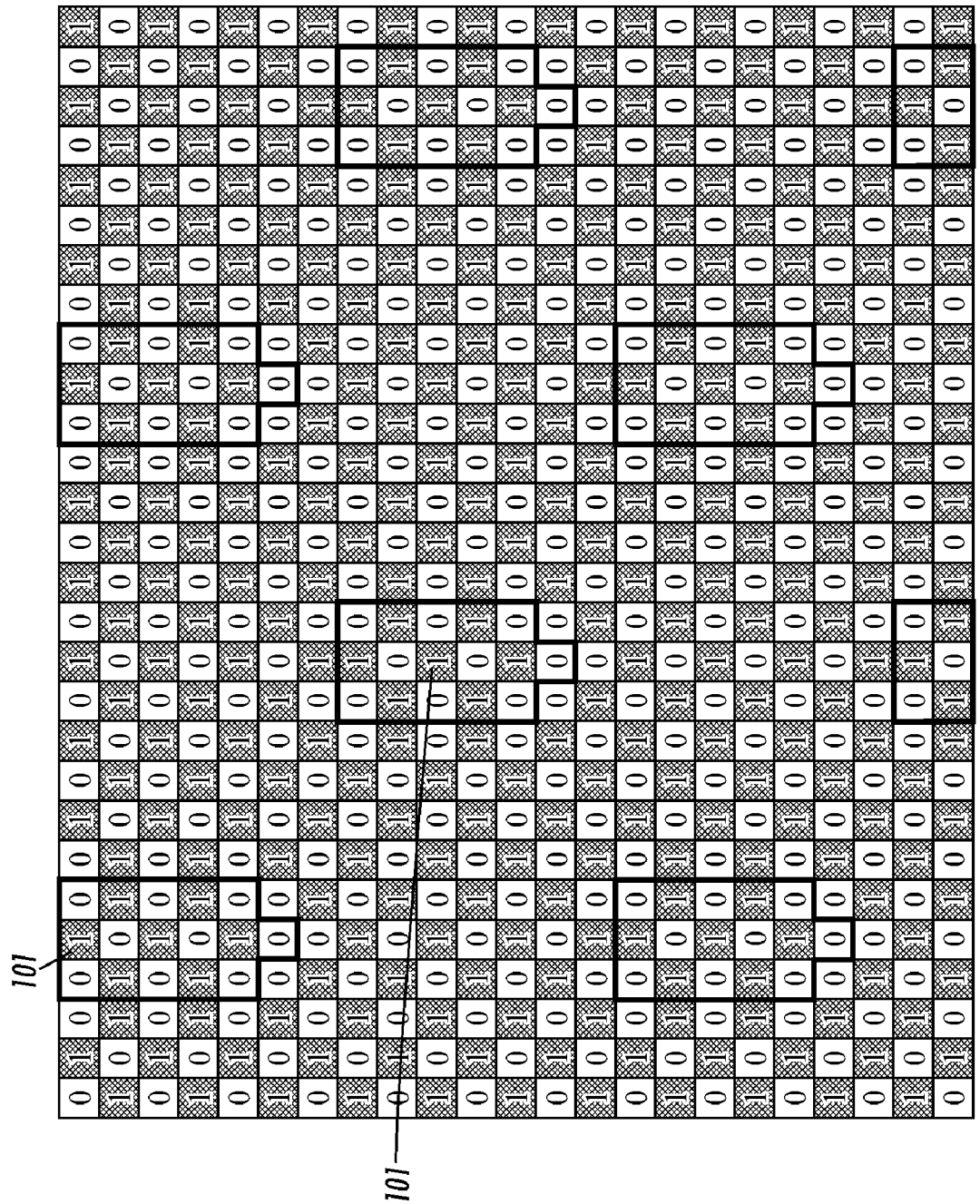
FIG. 4 shows an example of an encoded binary tile pattern.

The bit binary halftone tile pattern of FIG. 2 is encoded with the constant high frequency checkerboard pattern of FIG. 3 using an exclusive-OR operation to produce an encoded tile pattern as illustrated in FIG. 4. As illustrated in FIG. 4, the encoded original binary ON pixels are located in clusters 101.

Later, during bitmap processing, the high frequency patterns in the bitmap frame memory (or band buffers) are detected and decoded. The original halftone pattern is restored using the same X-OR operation and the same high frequency checkerboard pattern.

Figure 5:
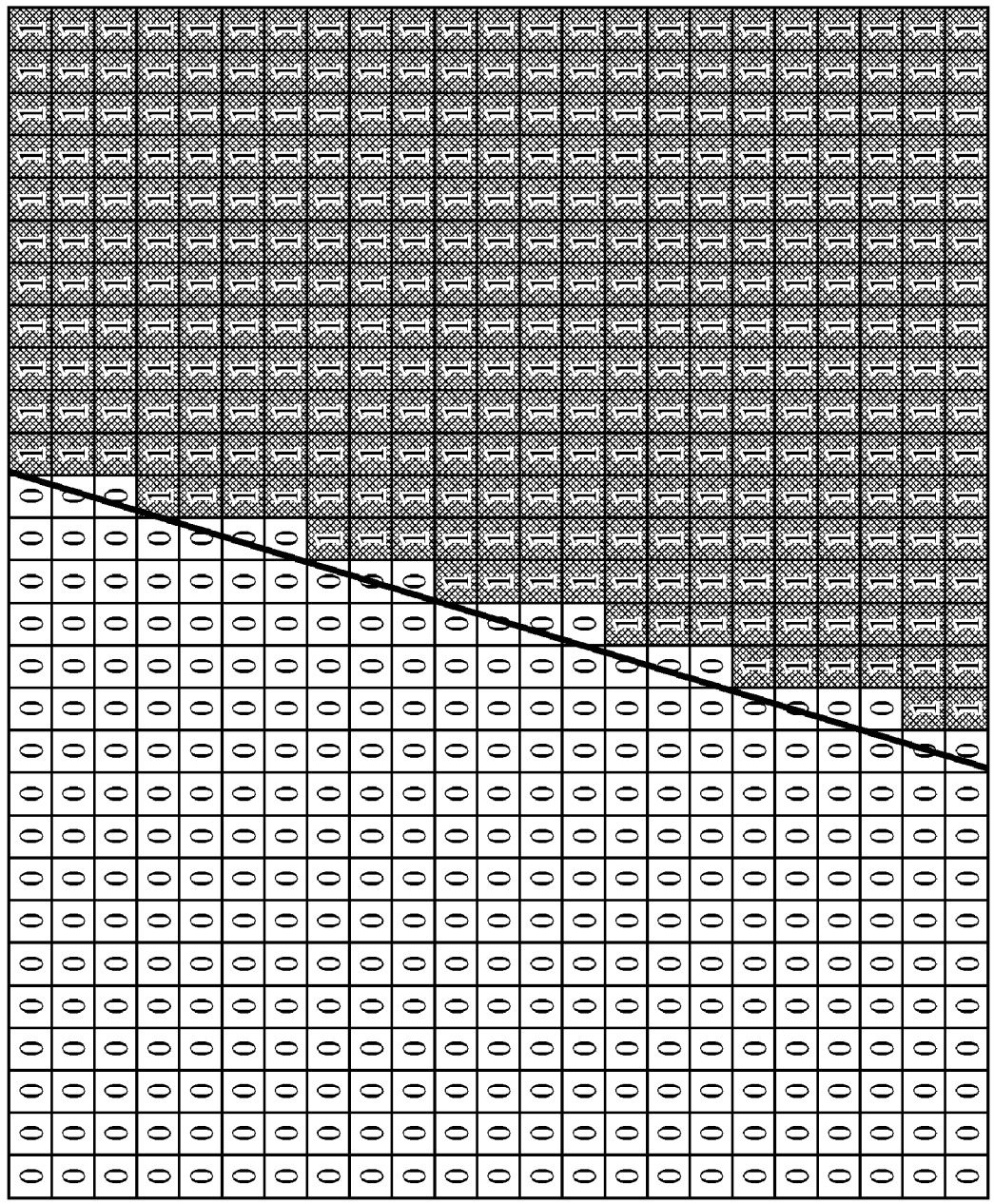
FIG. 5 shows an example of an object's edge at printer device resolution.
Figure 6:
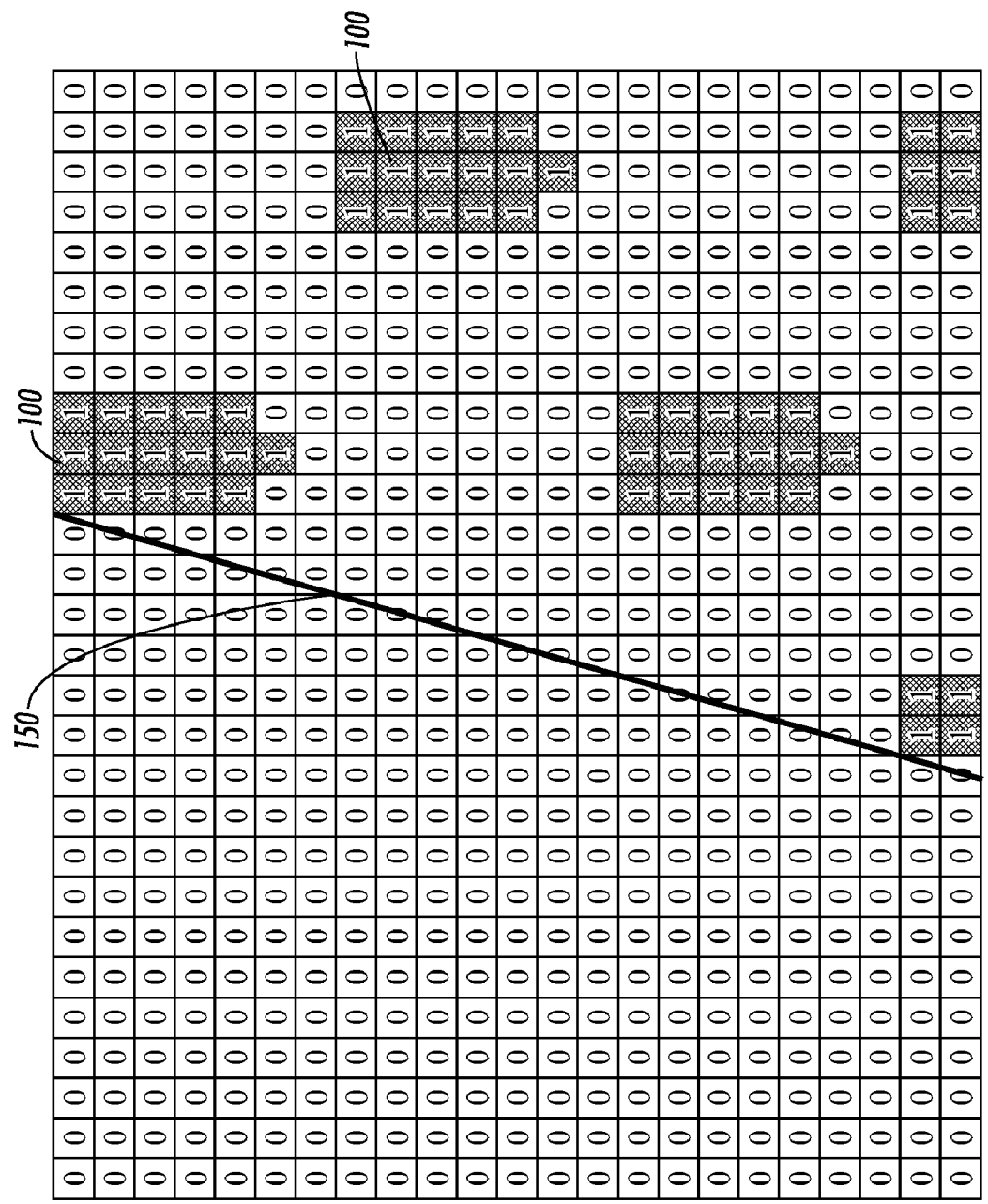
FIG. 6 shows an example of a halftoned object's edge at printer device resolution.
Figure 7:
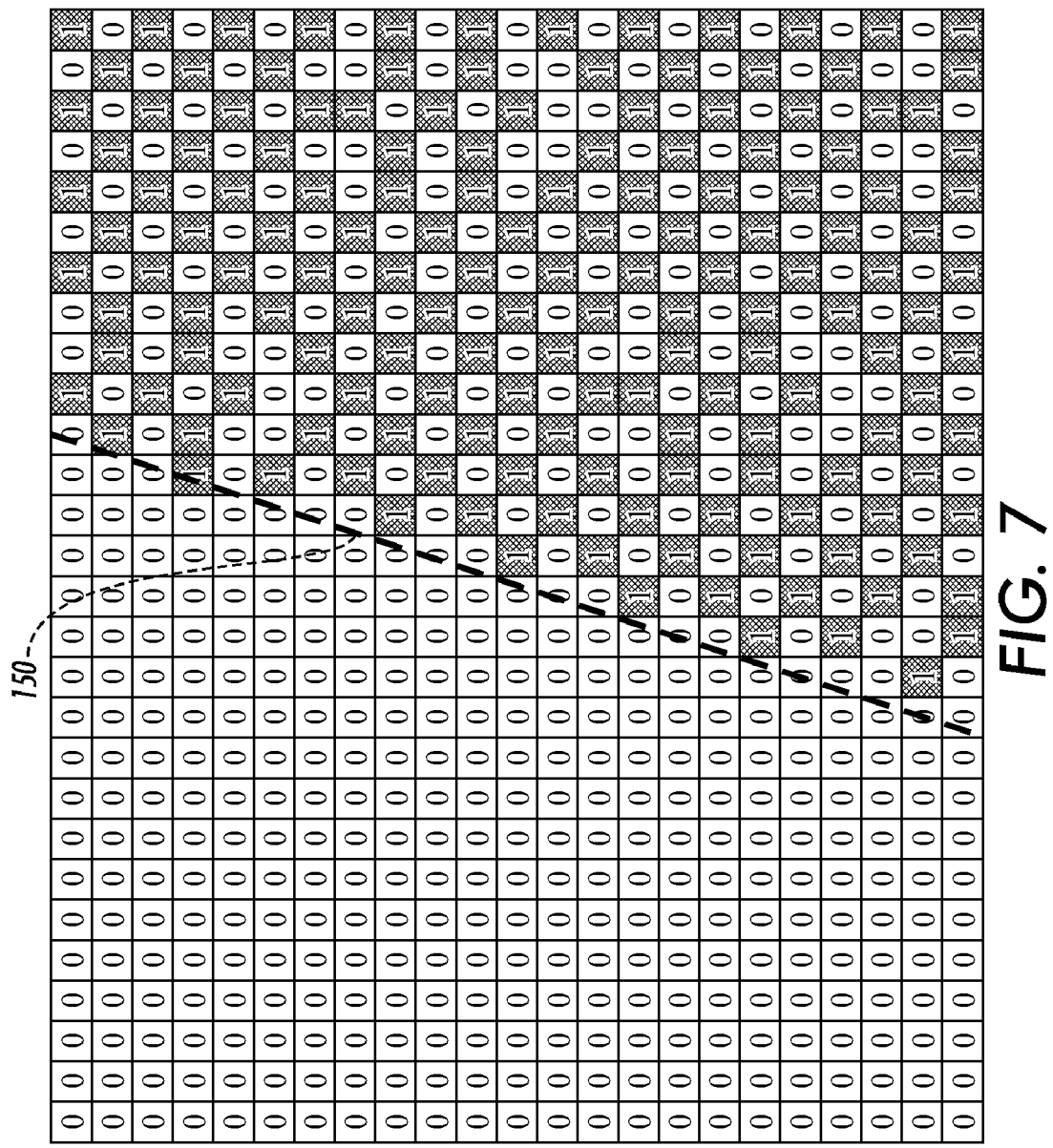
FIG. 7 shows an example of an encoded halftoned object's edge at printer device resolution.

FIG. 5 illustrates an edge 150 being represented by an object's edge at a printer device resolution. On the other hand, FIG. 6 illustrates the edge 150 of FIG. 5 as being represented by a halftoned object's edge at a printer device resolution. Furthermore, FIG. 7 illustrates the edge of FIG. 5 as being represented by an encoded halftoned object's edge at a printer device resolution.

Figure 8:
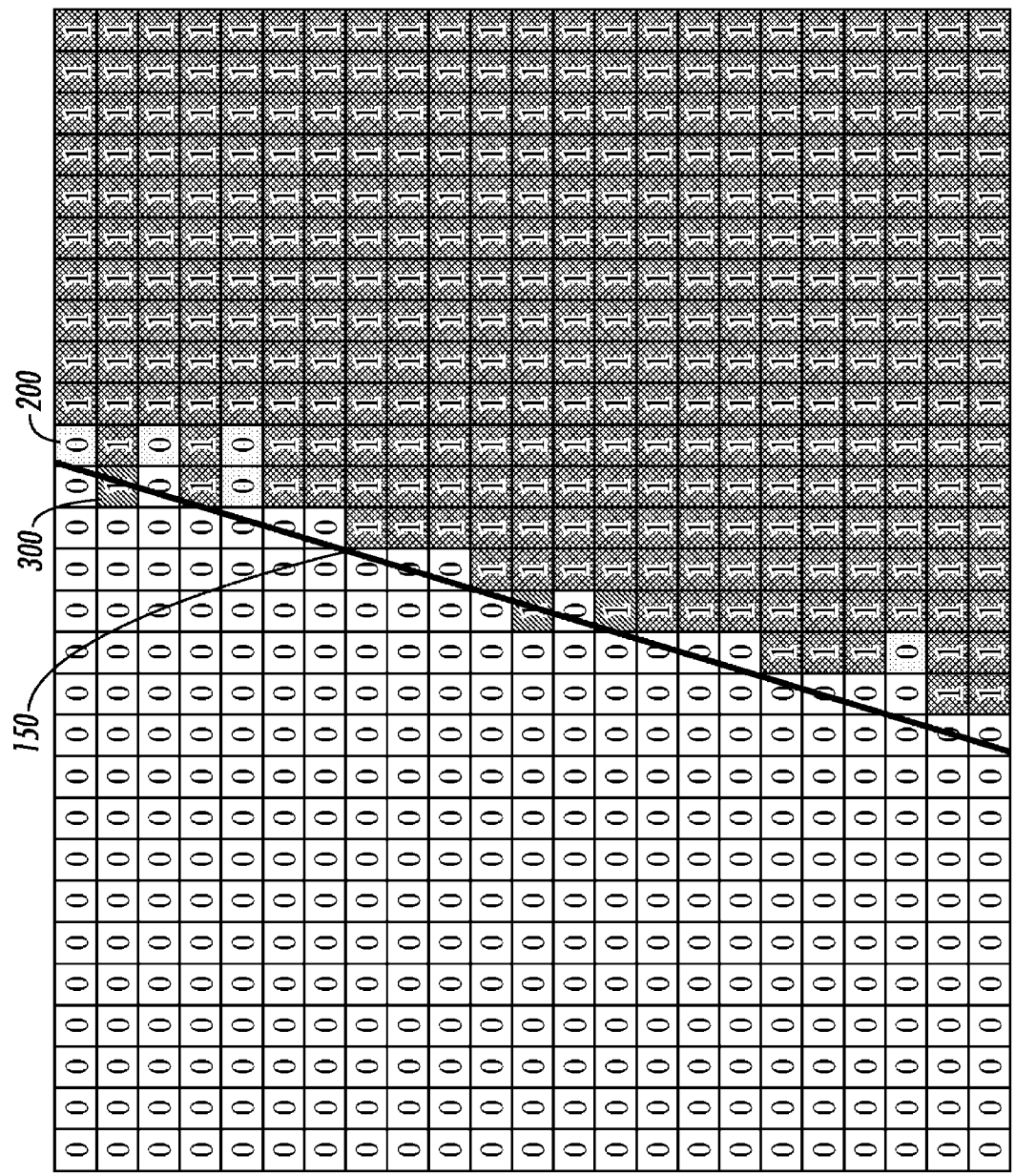
FIG. 8 shows an example of a decode mask.

As noted above, a decode mask is derived from the encoded halftoned pattern. FIG. 8 illustrates a decode mask with respect to the edge 150 of an object as illustrated in FIG. 5. The decode mask is created from the object representation of FIG. 7 using a pattern logic in look-up table. As illustrated in FIG. 8, the decode mask without errors is represented dark blue cells with the number 1. FIG. 8 also illustrates extra ON pixels 300 in the decode mask, represented by medium grey cells with the number 1, and missing ON pixels 200 from the decode mask, represented by lightly shaded cells with the number 0.

Figure 9:
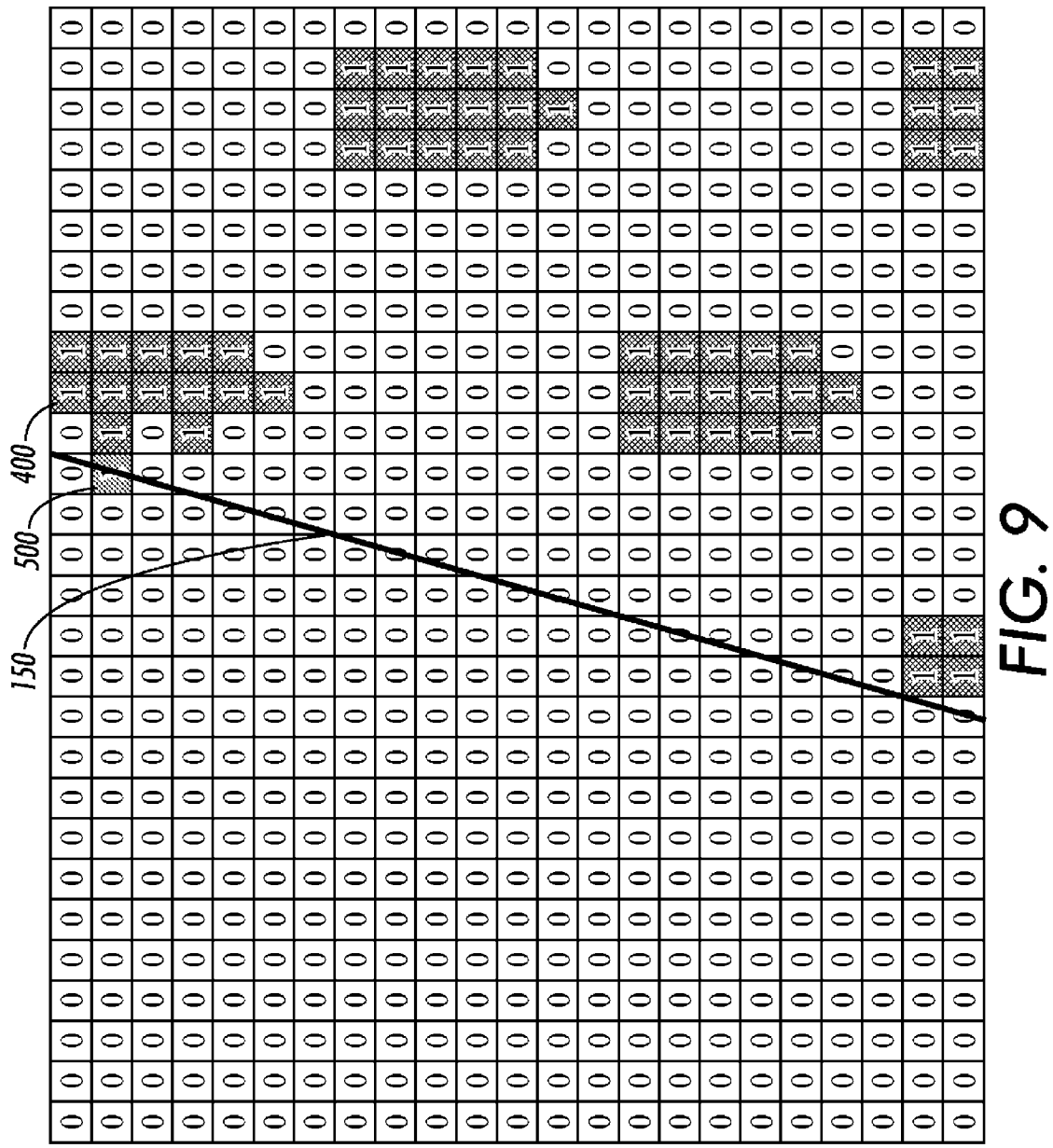
FIG. 9 shows an example of a decoded object.

FIG. 9 illustrates the decoded object. The decoded object of FIG. 9 is realized by applying an exclusive-OR to binary input and the high frequency checkerboard pattern of FIG. 3 inside the decode mask area of FIG. 8. As illustrated in FIG. 9, the dark shaded cells with the number 1 represent restored halftone pixels 400. FIG. 9 also illustrates a lightly shaded cell with the number 1, which represent an extra pixel 500 from decode errors on object edges.

Figure 10:
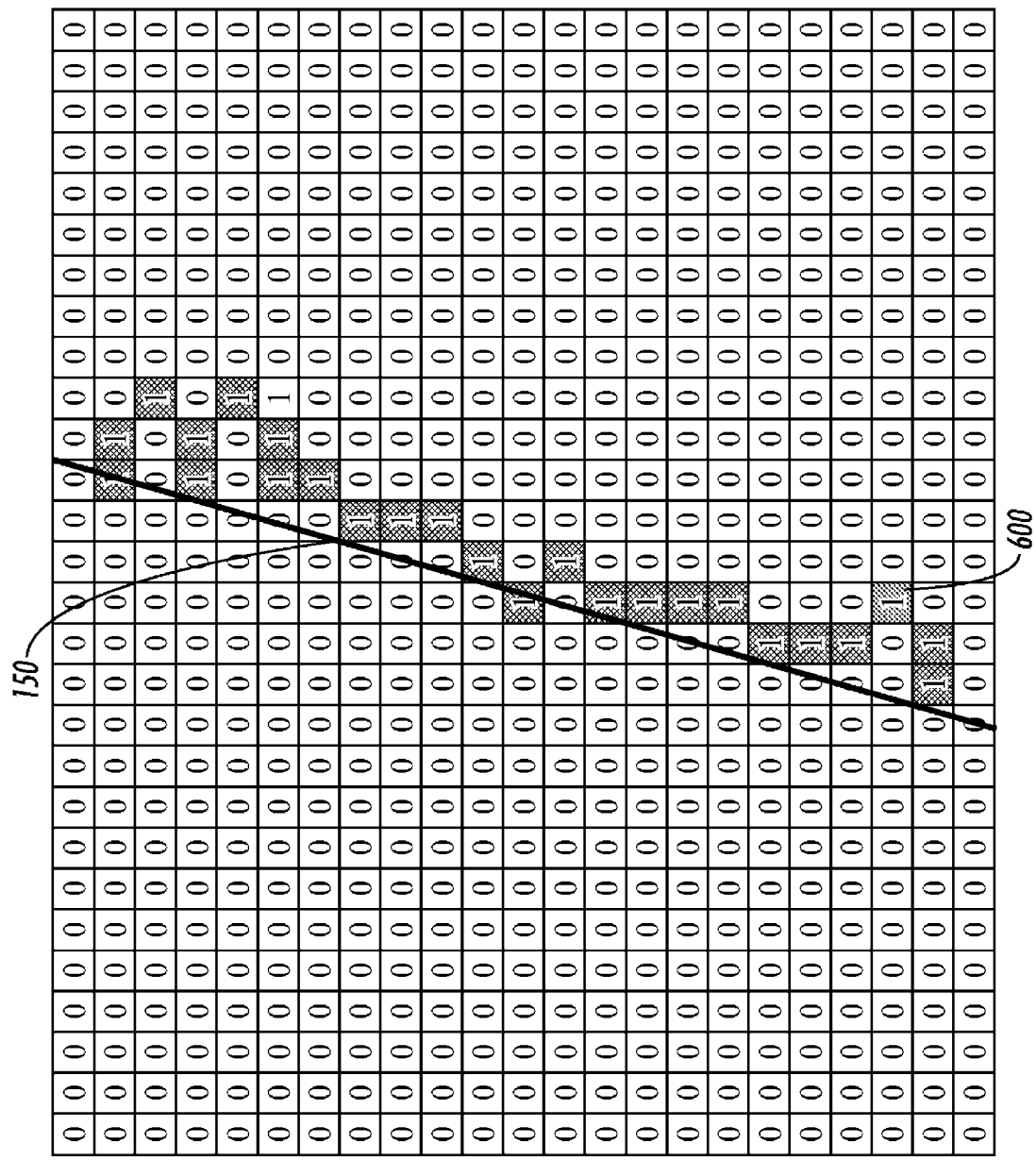
FIG. 10 shows an example of pixels on the edge of the decode mask.
Figure 11:
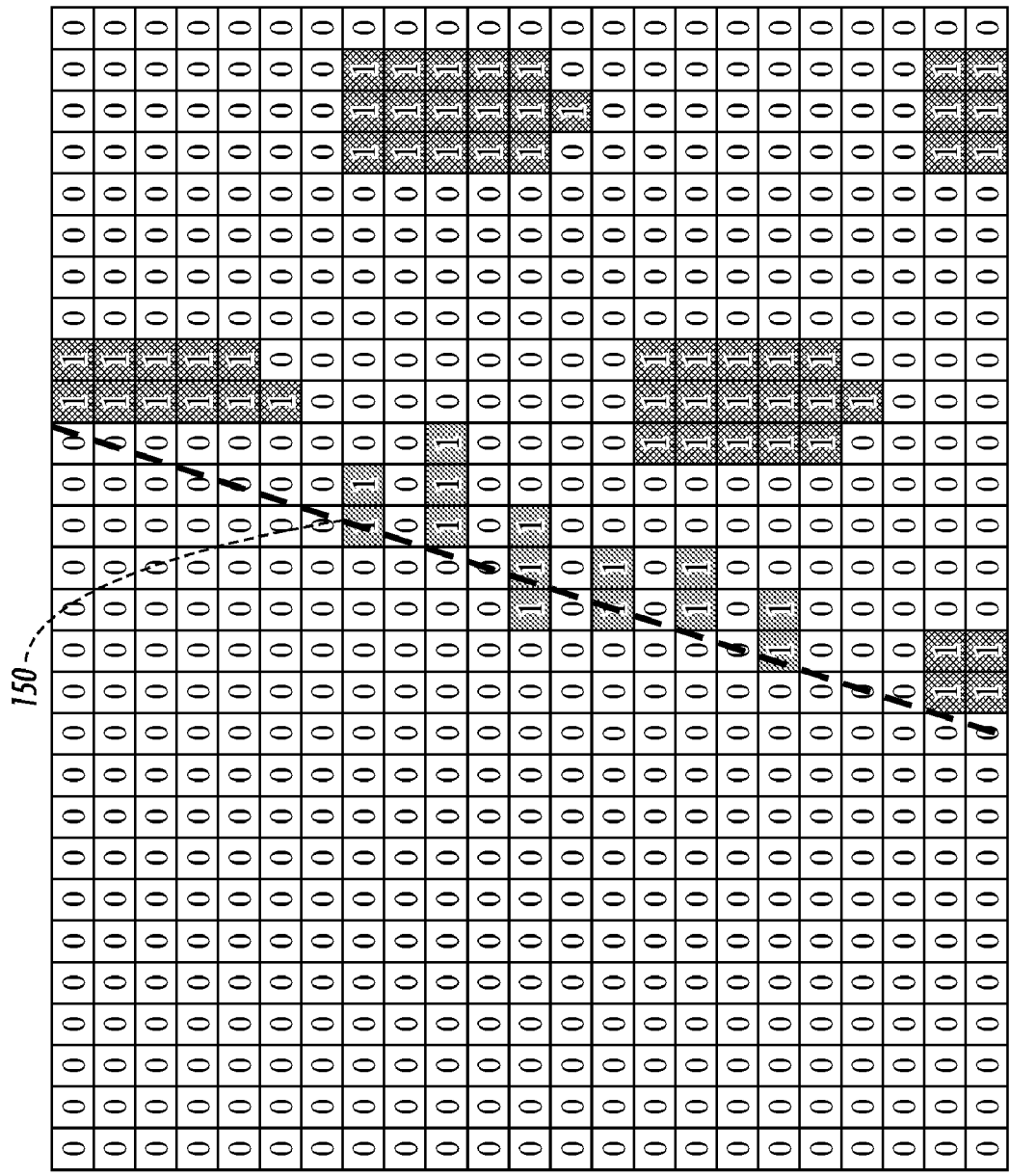
FIG. 11 shows an example of adding pixels on the edge after filtering and darkness adjustment.

FIG. 10 illustrates pixels on the edge of the decode mask of FIG. 8. As illustrated in FIG. 10, the shaded cell with the number 1 represents a misplaced edge pixel 600, as previously illustrated by one of the error pixels 200 in FIG. 8. FIG. 11 illustrates pixels added on the edge of the decoded object, as illustrated in FIG. 9, after filtering and darkness adjustments. To prevent edges that are too dark, edge candidates on every other column and row are erased. Candidate edge pixels are also erased near existing clusters. It is noted that pixels may be added adjacent to edge pixels to control the darkness and that control of edge pixel darkness is much better at higher scan resolutions; e.g., greater than or equal to 2400 dpi.

Figure 12:
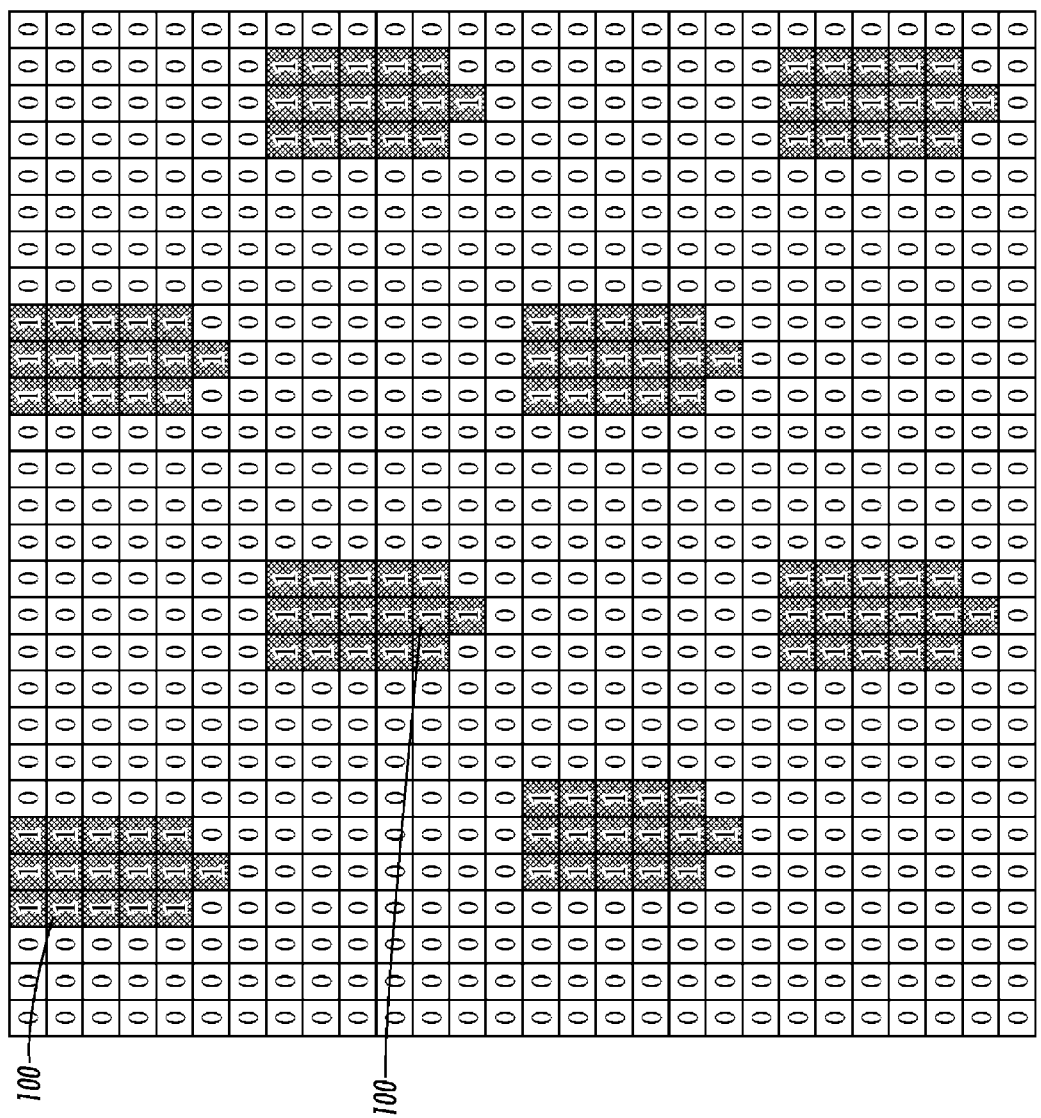
FIG. 12 shows another example of an original halftone.

FIG. 12 illustrates another example of a binary halftone tile pattern wherein the binary ON pixels are located in clusters 100. FIG. 13 illustrates a high frequency checkerboard pattern. The checkerboard pattern consists of alternating pixels, ON and OFF in both x and y directions.

Figure 14:
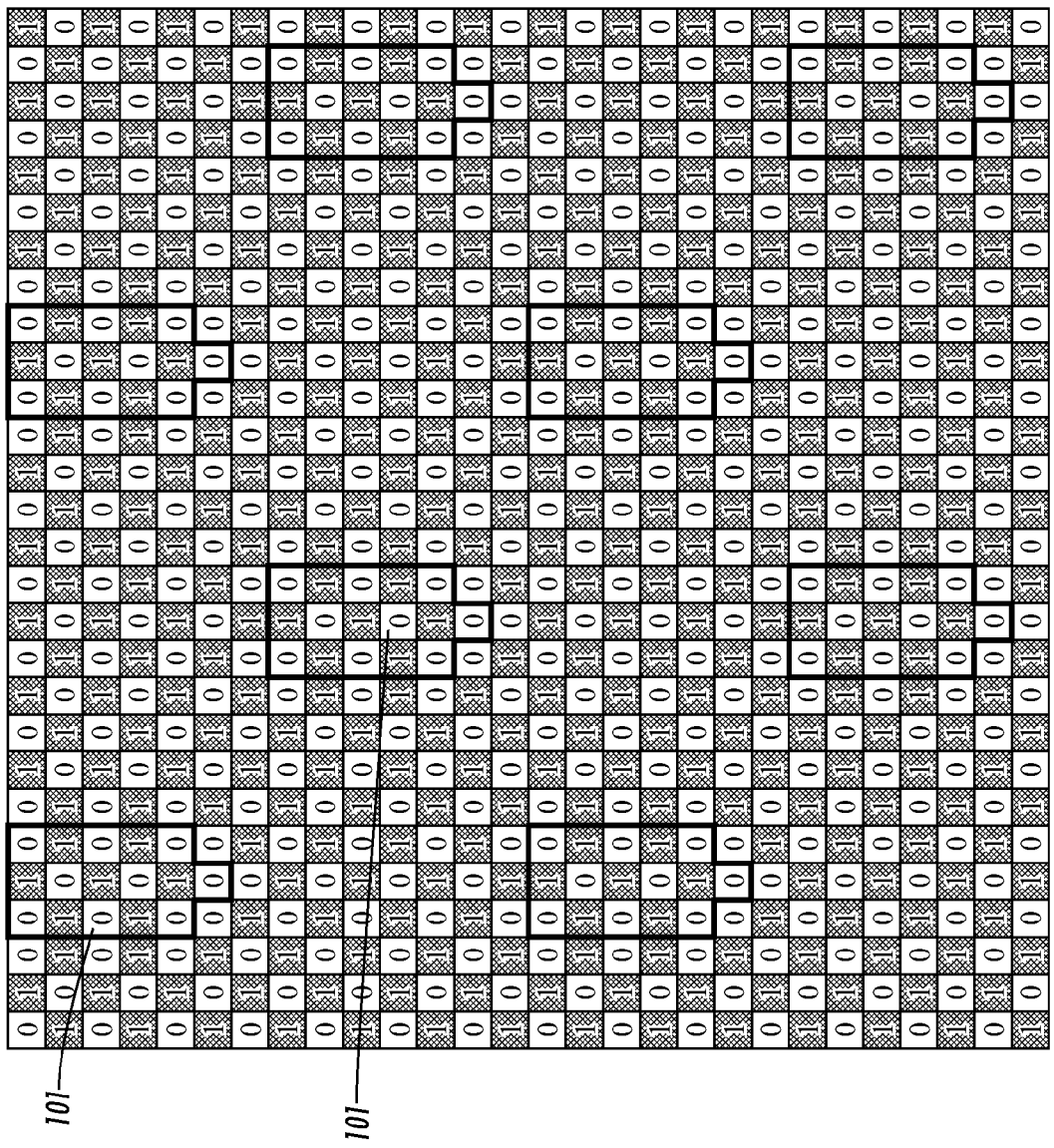
FIG. 14 shows another example of an encoded binary tile pattern.

The bit binary halftone tile pattern of FIG. 12 is encoded with the constant high frequency checkerboard pattern of FIG. 13 using an X-OR operation to produce an encoded tile pattern as illustrated in FIG. 14. As illustrated in FIG. 14, the encoded original binary ON pixels are located in clusters 101.

Figure 15:
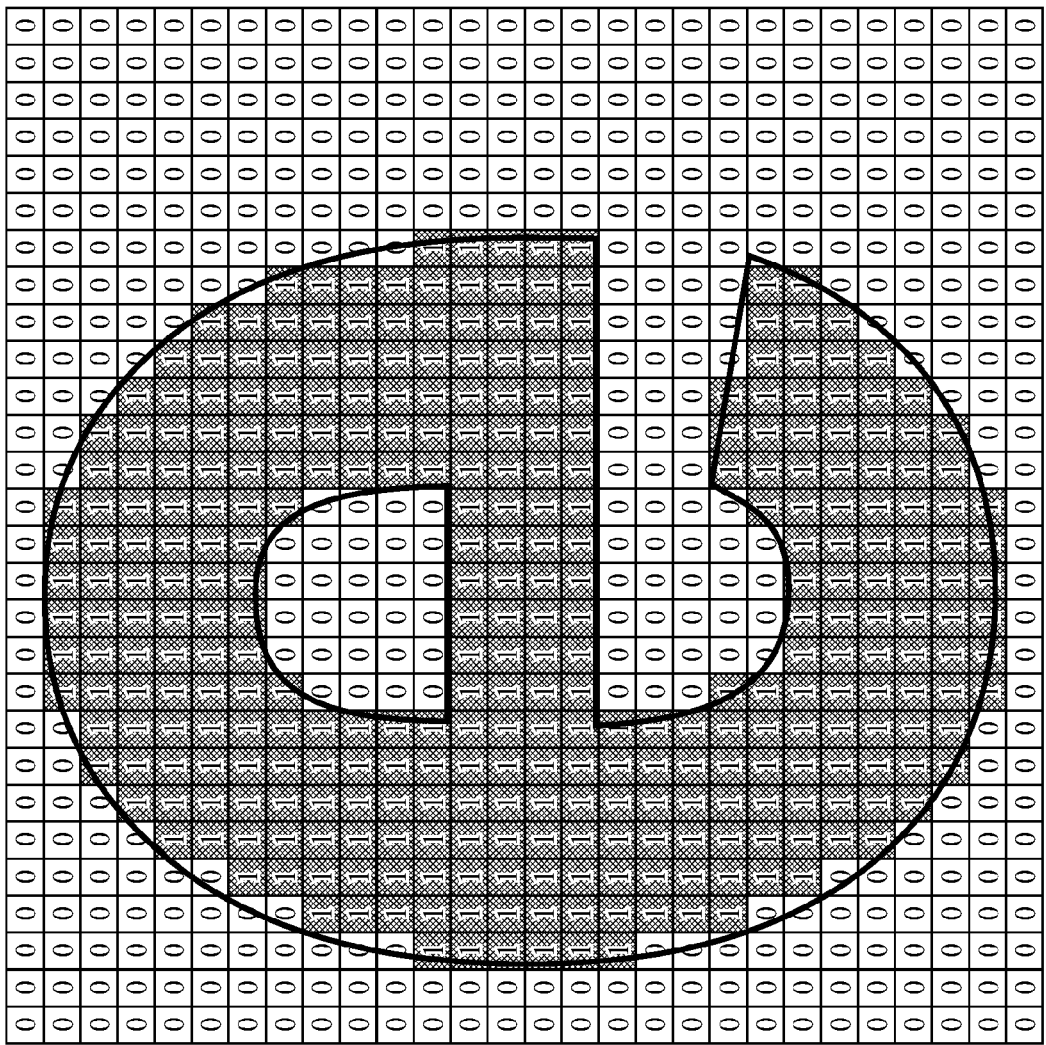
FIG. 15 shows an example of an object's shape at printer device resolution.
Figure 16:
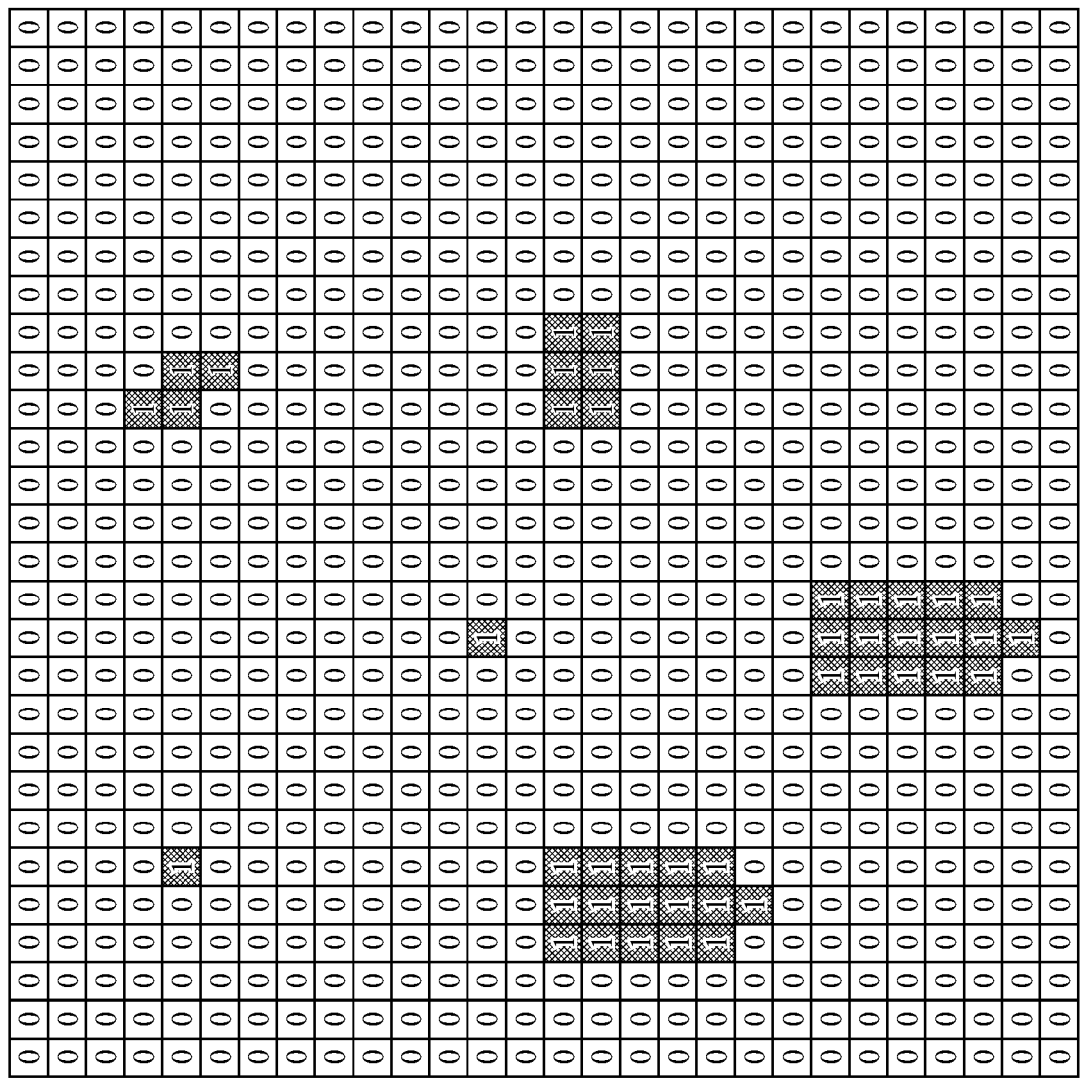
FIG. 16 shows an example of a halftoned object's shape at printer device resolution.
Figure 17:
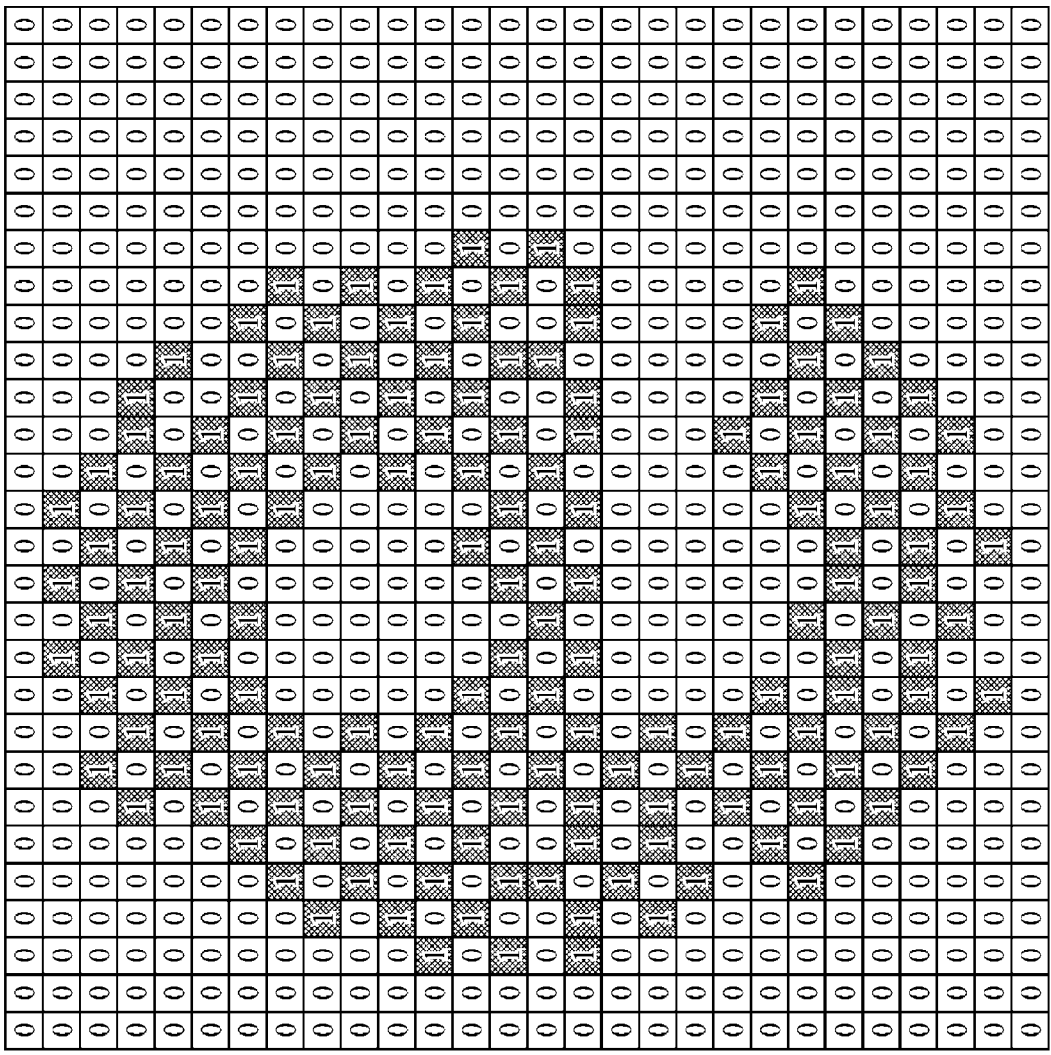
FIG. 17 shows an example of an encoded halftoned object.

FIG. 15 illustrates the object shape at printer device resolution. FIG. 16 is an example where the halftone does not show the shape of the object (letter "e"). FIG. 17 illustrates the edge of FIG. 15 as being represented by an encoded halftoned object (letter "e") at a printer device resolution.

Figure 18:
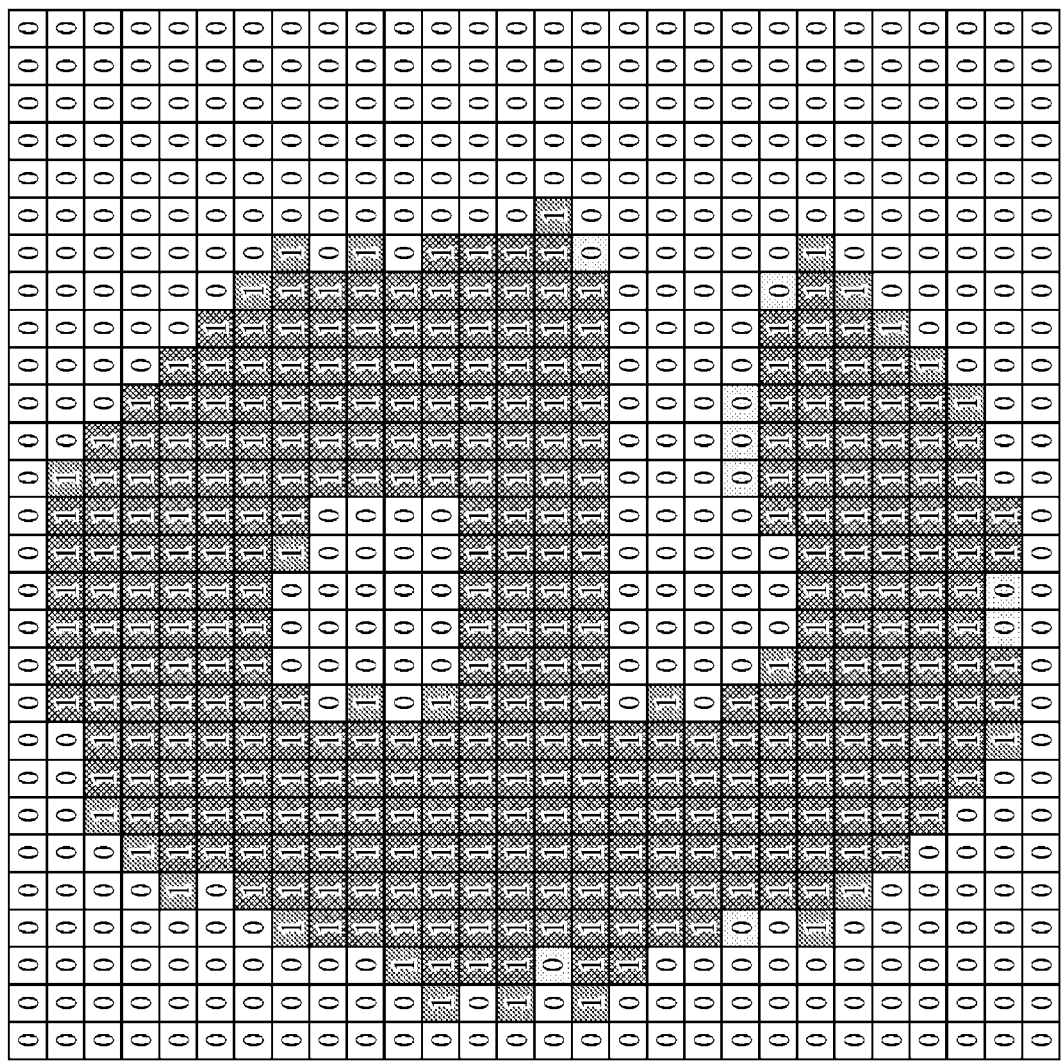
FIG. 18 shows another example of a decode mask.

As noted above, a decode mask is derived from the encoded halftoned pattern. FIG. 18 illustrates a decode mask with respect to the object as illustrated in FIG. 15. The decode mask is created from the object representation of FIG. 17 using a pattern logic in look-up table. As illustrated in FIG. 18, the decode mask without errors is represented dark blue cells with the number 1. FIG. 18 also illustrates extra ON pixels in the decode mask, represented by blue cells with the number 1, and missing ON pixels from the decode mask, represented by lightly shaded blue cells with the number 0.

Figure 19:
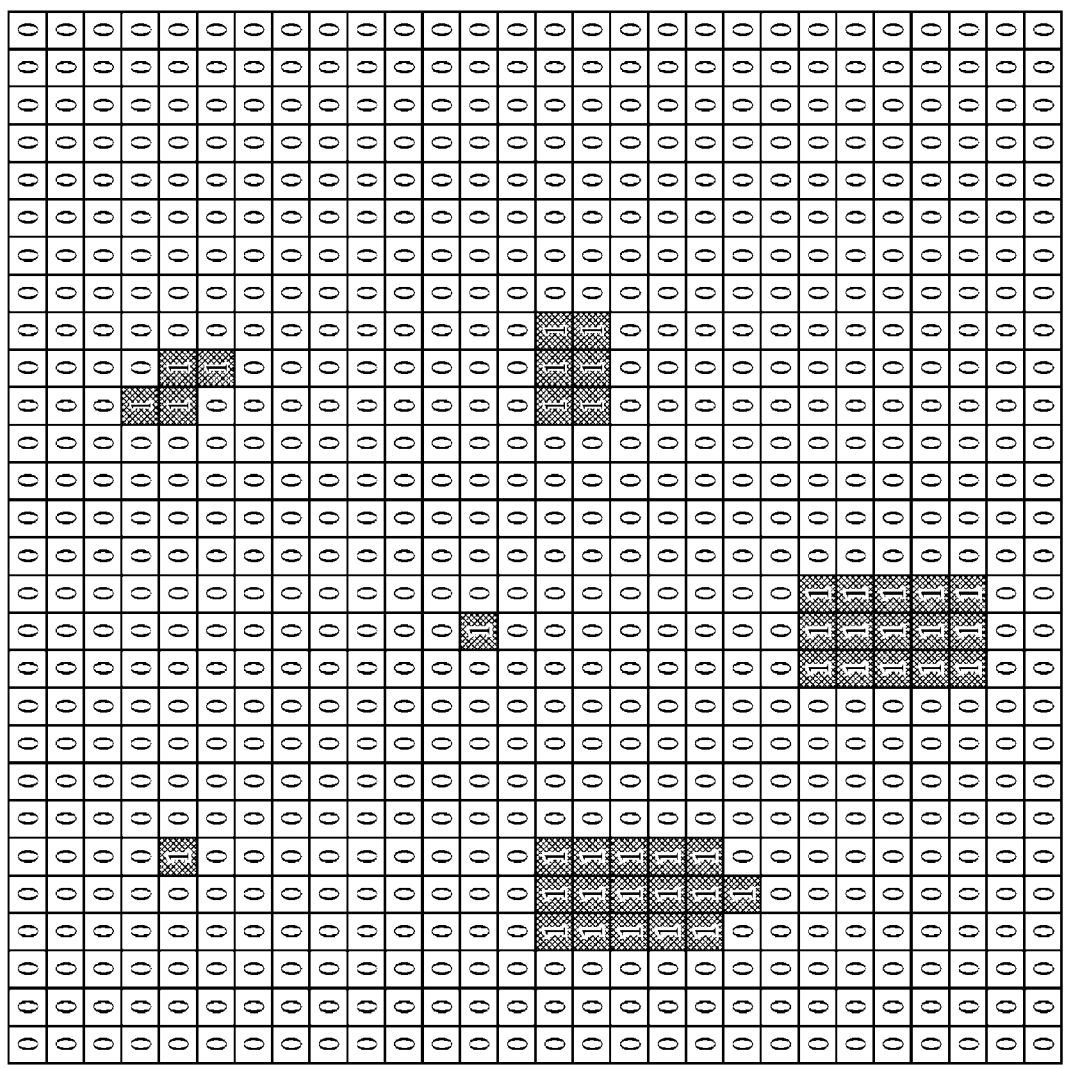
FIG. 19 shows another example of a decoded object.

FIG. 19 illustrates the decoded object. The decoded object of FIG. 19 is realized by applying an exclusive-OR to binary input and the high frequency checkerboard pattern of FIG. 13 inside the decode mask area of FIG. 18. As illustrated in FIG. 19, the dark blue cells with the number 1 represent restored halftone pixels. FIG. 19 also illustrates lightly shaded blue cells with the number 1, which represent extra pixels from decode errors on object edges.

Figure 20:
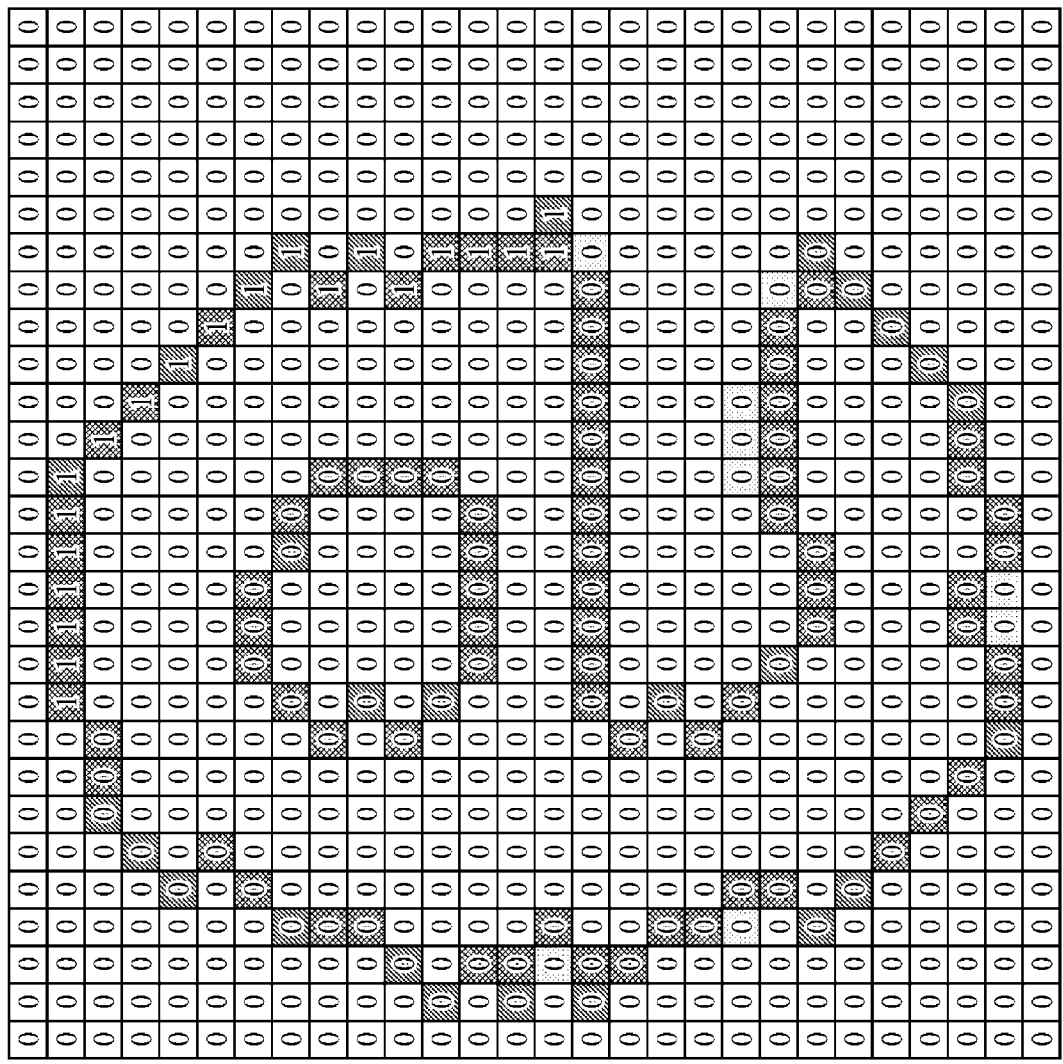
FIG. 20 shows another example of pixels on the edge of the decode mask.
Figure 21:
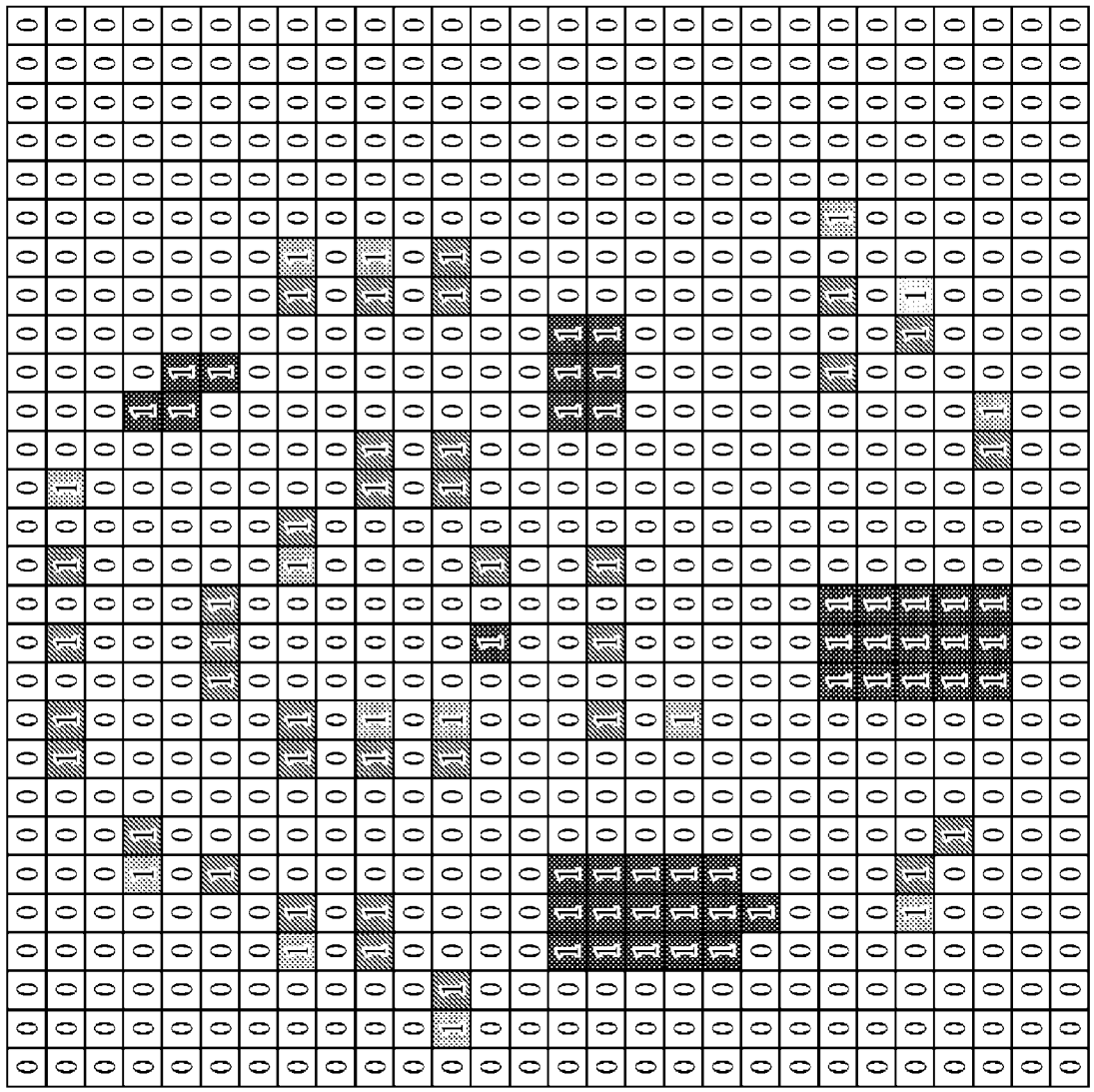
FIG. 21 shows another example of adding pixels on the edge after filtering and darkness adjustment.

FIG. 20 illustrates pixels on the edge of the decode mask of FIG. 18. FIG. 21 illustrates pixels added on the edge of the decoded object, as illustrated in FIG. 19, after filtering and darkness adjustments. To prevent edges that are too dark, edge candidates on every other column and row are erased. Candidate edge pixels are also erased near existing clusters. It is noted that pixels may be added adjacent to edge pixels to control the darkness and that control of edge pixel darkness is much better at higher scan resolutions; e.g., greater than or equal to 2400 dpi.

Since the edge smoothing process will add pixels to the bitmap and possibly enhance unintended areas, it is better to limit the enhancement to text and graphics objects, and avoid pictures. Thus, the controller software has two different methods for rendering. Pictures and raster images are rendered directly from halftone screens; whereas text and graphics objects are rendered from bitmap tile patterns, stored in a memory, which were previously prepared and saved using the same halftone. The color value for each pixel within object borders determines which of the pre-built bit patterns to apply. As described above, the tile patterns are encoded; however, pictures and images rendered in raster format are not encoded.

The halftone pattern tiles are rendered from the threshold arrays for each color level to be printed. The checkerboard encoding is selectively performed on patterns with levels that would benefit from edge smoothing. Edge enhancement around very light shades or darker grays is not necessary. Color levels that are dark enough to use most of the halftone pixels may not have jagged edges, so it is a benefit to skip those areas. A good range for gray level encoding might be 15% to 85%, but it depends on the halftone frequency and the visibility of the edges as printed on paper.

In another embodiment, only every other raster of the checkerboard pattern may be encoded so that edge pixels will only be added to alternate rasters, as fine separated dots, 1 pixel apart in the vertical direction, rather than fine lines.

Before printing, the bitmap process filters the rendered data in the frame (or band) memory. The high frequency data from the checkerboard pattern is decoded to restore the original halftone, and it is masked for possible edge bits. The low frequency data, which includes picture data, blank areas, fully saturated areas, and areas outside the gray level range of the encoding is passed on undisturbed. To restore the original halftone patterns, the data and checkerboard pattern undergo an exclusive-OR operation in the same manner as the encoding was previously done. At the same time, a bitmap mask is generated that identifies areas covered by the encoded halftone patterns.

The decoding operation can be represented as OutputBits= ((InputBits^0xaaaa) & maskBits)|(InputBits & ~maskBits)) wherein 0xaaaa is the checkerboard encoding for this raster.

The method used to generate the mask data, which identifies encoded pixels, may utilize a look-up table. The look-up table provides a mask pattern from any input pattern. The input value is a pattern from a sample in the bitmap. For each pattern looked-up from the mask table, a predetermined number of new output mask bits are generated.

The algorithm to generate the table may be derived from logic rules; e.g., knowing which halftone patterns are expected vs. those that are encoded. If, for instance, the bitmap resolution is 2400 or 1200 dpi, the halftone may not contain any isolated pixels in the scan direction. As clusters start or grow into new scan lines, two or more pixels might be added instead of one to achieve a minimum laser pulsewidth. Since the encoding with the checkerboard pattern consists of mostly isolated pixels, looking for pixel groups less than the minimum expected from the halftone may identify some encoded areas. Another attribute of clustered halftones is a periodic distance between clusters. If an arbitrary input pattern is decoded (exclusive-OR with the checkerboard pattern), the valid areas of encoding will not include areas where the cycle period is less than the halftone cluster period.

An example of the rules to generate the mask table for a 1200×1200 dpi pattern is:
1. Any cycle period with 3 transitions (0-1-0-1, or 1-0-1-0)<=4 pixels, the encode mask spans the cycle.
2. If the mask just found is next to a 0 in the checkerboard pattern, the mask is stretched 1 pixel to include the 0. (The exclusive-OR decode operation will not change the original bitmap where 0s occur in the checkerboard pattern, so this does not introduce a decoding error.)
3. As necessary, forcing specific patterns to have the correct mask generates a small number of mask values. This is done by inspection of the patterns generated in the bitmap vs. the desired patterns.

It is noted that the generation of the mask may introduce a 1-2 pixel error at the interface between encoded and normal halftone patterns. In some cases, the error is not seen, but if it is, the mask bits can be tuned to include or exclude a specific input pattern.

After decoding, the mask pattern is retained to identify edges. The bits are found using logical bit operations on the mask. The result contains is corresponding to the edge locations of the mask.

If all the edges found are printed, the gradient fills will contain unwanted edges along the boundaries of the encoded areas. If shades between 15% and 85% were encoded, edges would appear where the gradient crosses these levels. A filter can be applied to the edge bits at each location to erase the bits that might be on the boundary of a gradient, or next to an un-encoded gray area. Segmenting the frame or band bitmap into square tiles, and counting all the un-encoded pixels provides the information needed for this decision. The pixel counting can be done in the same process as finding the mask and decoding as described above. The pixel counting results are saved, and used later when the edges are processed.

The counts of un-encoded pixels are summed from the tiles surrounding each possible edge. The area coverage for this summation should be large enough to cover even the lightest halftone patterns where the clusters are spread out the most. The implementation here sums the counts of the tile, in which the edge is, plus all eight of the surrounding tiles surrounding. The edge pixels are erased or converted to 0 in any area where this sum is greater than 0. The remaining edges are only those that are on the border between halftoned areas and white.

The edge pixels at this point border halftoned objects. Adding pixels near existing clusters will make the clusters darker, and make the edge look worse. Thus, the process only fills between the clusters to bridge the gaps.

The number of pixels added at each eligible edge location controls the edge darkness. If the shade of the object is light, the added pixels should be minimum, and if the shade is dark, more edge pixels may be added to fill in between the jagged halftone structure. To do this, an estimate must be made to guess how dark this halftone shade is.

A very coarse assumption is that each edge pixel found evenly divides a halftone bit pattern, and some symmetry may exist. If this is true, the pixel count surrounding each edge pixel will indicate the level.

For example, in a 1200×1200 dpi implementation, the halftone cell area may be 98 pixels. If the count is done and pixels from 3 rasters (one above, the center raster, and one raster below the edge) are added, a sample of 65 pixels in each row adds up to an area of 195 pixels, which is about 2× the cell area. The sum from this count is compared to threshold values to decide if one or two pixels should be added to make the edge darker. The implementation may only add one pixel to the left or right of non-horizontal edges with a single threshold when the count is more than 40.

For non-vertical edges, the enhancement for above or below is controlled by a single mask with 3 of every 4 pixels enabled. The adjustments of the left and right enhancement, and the top or bottom may be made from trial printing until the best balance is obtained on the page. Test prints with all edge enhanced levels inside of square and rhombus shapes at various angles may reveal most issues.

It is noted that pure vertical and horizontal edges may be difficult to control. The added pixels tend to reinforce more than desired as a function of the added pixels' distance from the halftone clusters. A smaller distance may reinforce the existing clusters more than desired, and produce a faint visible line. If the very light shades have extra dark edges, the color level for encoding can be increased to avoid adding add edges at these levels. Moreover, an implementation may only add edge pixels on every other raster line that keeps the edges light enough for a 15% shade.

After the generation of possible edge bits, and all the filtering, the edge pixels are added to the buffer memory, and the result is sent to the print engine. As previously mentioned, the edges can be tested with various shades in an assortment of shapes. For monochrome printing, colored text is printed as halftoned gray levels. The edges of the lighter shades have more improvement. The edges of darker areas can be made smoother by allowing edge pixel additions to be closer to the existing halftone clusters, but that must be compromised a little to prevent unwanted visible borders.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image processing system, comprising:
an image type classification circuit to identify inputted image data as picture image data, text image data, or graphics image data;
a halftone circuit, operatively connected to said image type classification circuit, to convert the inputted image data, identified as picture image data, to halftone image data;
a tile pattern circuit, operatively connected to said image type classification circuit, to replace the inputted image data, identified as text image data or graphics image data, with tile patterns;
an encoding circuit, operatively connected to said tile pattern circuit, to encode the tile patterns with a high frequency checkerboard pattern;
a bitmap rendering circuit, operatively connected to said encoding circuit and said halftone circuit, to combine the halftone image data from said halftone circuit with the encoded tile patterns from said encoder circuit to render a bitmap;
a buffer to store said bitmap;
a filter bitmap circuit, operatively connected to said buffer, to create a decode mask, said decode mask identifying an encoded area of said bitmap; and
said filter bitmap circuit decoding the area of said bitmap corresponding to said decode mask;
an edge process circuit, operatively connected to said filter bitmap circuit, to identify edge pixel candidates in said decode mask, the identified edge pixel candidates corresponding to pixels located at an edge of said decode mask;
said edge process circuit determining if an identified edge pixel candidate is located adjacent an un-encoded gray area;
said edge process circuit filtering out the identified edge pixel candidate when said edge process circuit determines that the identified edge pixel candidate is located adjacent an un-encoded gray area;
said edge process circuit determining an identified edge pixel candidate is located between clusters of pixels in the decoded area of said bitmap corresponding to said decode mask;
said edge process circuit filtering out the identified edge pixel candidate when said edge process circuit determines that the identified edge pixel candidate is not located between clusters of pixels in the decoded area of said bitmap corresponding to said decode mask;
said edge process circuit adding pixels to the decoded area of said bitmap corresponding to said decode mask at locations corresponding to the non-filtered out identified edge pixel candidates.

2. A method for processing image data, comprising:
(a) identifying inputted image data as picture image data, text image data, or graphics image data;
(b) converting the inputted image data, identified as picture image data, to halftone image data;

(c) replacing the inputted image data, identified as text image data or graphics image data, with tile patterns;
(d) encoding the tile patterns with a high frequency checkerboard pattern;
(e) combining the halftone image data with the encoded tile patterns to render a bitmap;
(d) storing the bitmap in a buffer;
(e) creating a decode mask, the decode mask identifying an encoded area of the bitmap;
(f) decoding the area of the bitmap corresponding to the decode mask;
(g) identifying edge pixel candidates in the decode mask, the identified edge pixel candidates corresponding to pixels located at an edge of the decode mask;
(h) determining if an identified edge pixel candidate is located adjacent an un-encoded gray area;
(i) filtering out the identified edge pixel candidate when it is determined that the identified edge pixel candidate is located adjacent an un-encoded gray area;
(j) determining an identified edge pixel candidate is located between clusters of pixels in the decoded area of the bitmap corresponding to the decode mask;
(k) filtering out the identified edge pixel candidate when it is determined that the identified edge pixel candidate is not located between clusters of pixels in the decoded area of the bitmap corresponding to the decode mask; and
(l) adding pixels to the decoded area of the bitmap corresponding to the decode mask at locations corresponding to the non-filtered out identified edge pixel candidates.

3. An image processing system, comprising:
an image type classification circuit to identify inputted image data as picture image data, text image data, or graphics image data;
a halftone circuit, operatively connected to said image type classification circuit, to convert the inputted image data, identified as picture image data, to halftone image data;
a tile pattern circuit, operatively connected to said image type classification circuit, to replace the inputted image data, identified as text image data or graphics image data, with tile patterns; said tile patterns being a halftone pattern being exclusive-ORed with a high frequency checkerboard pattern;
a bitmap rendering circuit, operatively connected to said tile pattern circuit and said halftone circuit, to combine the halftone image data from said halftone circuit with the tile patterns from said tile pattern circuit to render a bitmap;
a buffer to store said bitmap;
a filter bitmap circuit, operatively connected to said buffer, to create a decode mask, said decode mask identifying an encoded area of said bitmap; and
said filter bitmap circuit decoding the area of said bitmap corresponding to said decode mask;
an edge process circuit, operatively connected to said filter bitmap circuit, to identify edge pixel candidates in said decode mask, the identified edge pixel candidates corresponding to pixels located at an edge of said decode mask;
said edge process circuit determining if an identified edge pixel candidate is located adjacent an un-encoded gray area;
said edge process circuit filtering out the identified edge pixel candidate when said edge process circuit determines that the identified edge pixel candidate is located adjacent an un-encoded gray area;
said edge process circuit determining an identified edge pixel candidate is located between clusters of pixels in the decoded area of said bitmap corresponding to said decode mask;
said edge process circuit filtering out the identified edge pixel candidate when said edge process circuit determines that the identified edge pixel candidate is not located between clusters of pixels in the decoded area of said bitmap corresponding to said decode mask;
said edge process circuit adding pixels to the decoded area of said bitmap corresponding to said decode mask at locations corresponding to the non-filtered out identified edge pixel candidates.

* * * * *